(12) United States Patent
Hough

(10) Patent No.: US 9,305,671 B2
(45) Date of Patent: Apr. 5, 2016

(54) MANAGING ELECTRICAL POWER FOR A NUCLEAR REACTOR SYSTEM

(71) Applicant: NuScale Power, LLC, Corvallis, OR (US)

(72) Inventor: Ted Hough, Corvallis, OR (US)

(73) Assignee: NuScale Power, LLC, Corvallis, OR (US)

( * ) Notice: Subject to any disclaimer, the term of this patent is extended or adjusted under 35 U.S.C. 154(b) by 651 days.

(21) Appl. No.: 13/795,911

(22) Filed: Mar. 12, 2013

(65) Prior Publication Data

US 2014/0152098 A1  Jun. 5, 2014

Related U.S. Application Data

(60) Provisional application No. 61/733,258, filed on Dec. 4, 2012.

(51) Int. Cl.

| | |
|---|---|
| *H02J 3/38* | (2006.01) |
| *H02J 9/04* | (2006.01) |
| *G21D 3/04* | (2006.01) |
| *G21D 1/00* | (2006.01) |
| *H02J 3/00* | (2006.01) |
| *G21D 1/02* | (2006.01) |

(52) U.S. Cl.
CPC .. *G21D 3/04* (2013.01); *G21D 1/00* (2013.01); *H02J 3/006* (2013.01); *Y02E 30/40* (2013.01); *Y04S 10/525* (2013.01); *Y10T 307/344* (2015.04)

(58) Field of Classification Search
CPC ........................................................ H02J 3/005
USPC .......................................................... 307/23
See application file for complete search history.

(56) References Cited

U.S. PATENT DOCUMENTS

| | | |
|---|---|---|
| 6,674,826 B1 | 1/2004 | McFetridge |
| 6,892,115 B2 | 5/2005 | Berkcan et al. |
| 6,892,145 B2 | 5/2005 | Topka et al. |
| 6,909,942 B2 | 6/2005 | Andarawis et al. |
| 6,999,291 B2 | 2/2006 | Andarawis et al. |
| 7,068,612 B2 | 6/2006 | Berkcan et al. |
| 7,149,655 B2 | 12/2006 | Frederick et al. |

(Continued)

FOREIGN PATENT DOCUMENTS

| | | |
|---|---|---|
| JP | 2001242397 A | 9/2001 |
| WO | WO2012159541 A1 | 11/2012 |

OTHER PUBLICATIONS

Stoner et al., Working Group SC 4.1 IEEE Std 308-2001 (IEEE Standard Criteria for Class 1E Power Systems for Nuclear Power Generating Stations), Mar. 1, 2002.*

(Continued)

*Primary Examiner* — Rexford Barnie
*Assistant Examiner* — Thai Tran
(74) *Attorney, Agent, or Firm* — Lowe Graham Jones PLLC

(57) ABSTRACT

An electrical power system for a nuclear power facility includes an active alternating current (AC) power bus configured to be electrically coupled to a plurality of engineered safety feature (ESF) loads of a plurality of nuclear power systems, each of the ESF loads configured to fail to a safe position upon loss of primary AC power; a critical battery system electrically coupled to the active AC bus, the critical battery system comprising a plurality of valve regulated lead acid (VRLA) batteries; and a primary AC power source electrically coupled to the active AC bus.

19 Claims, 7 Drawing Sheets

(56) References Cited

U.S. PATENT DOCUMENTS

| | | | |
|---|---|---|---|
| 7,151,329 | B2 | 12/2006 | Andarawis et al. |
| 7,301,738 | B2 | 11/2007 | Pearlman et al. |
| 7,364,043 | B2 | 4/2008 | Ong et al. |
| 7,386,086 | B1 | 6/2008 | Harbaugh |
| 7,555,092 | B2 | 6/2009 | Russell et al. |
| 7,747,356 | B2 | 6/2010 | Andarawis et al. |
| 8,117,512 | B2 | 2/2012 | Sorensen et al. |
| 8,156,251 | B1 | 4/2012 | Sorensen et al. |
| 8,554,953 | B1 | 10/2013 | Sorensen et al. |
| 8,599,987 | B2 | 12/2013 | Morris |
| 8,695,688 | B2 | 4/2014 | Schneider et al. |
| 2005/0229037 | A1* | 10/2005 | Egan ............... G06F 11/2015 714/14 |
| 2006/0066104 | A1* | 3/2006 | Melfi ............... H02J 9/066 290/1 A |
| 2006/0192529 | A1* | 8/2006 | Kimura ............... H02J 7/0026 320/116 |
| 2008/0034256 | A1* | 2/2008 | Mosman ............... H02J 9/06 714/43 |
| 2008/0179956 | A1 | 7/2008 | Jiang et al. |
| 2009/0245453 | A1* | 10/2009 | Jeong ............... G21C 15/18 376/299 |
| 2010/0237702 | A1 | 9/2010 | Stocker |
| 2011/0072290 | A1* | 3/2011 | Davis ............... G06F 1/30 713/324 |
| 2011/0209021 | A1* | 8/2011 | Sorensen et al. ............... 714/733 |
| 2012/0207261 | A1* | 8/2012 | Noel ............... G21D 1/00 376/277 |

OTHER PUBLICATIONS

Linda, U.S. Department of Energy Order DOE 5480.30 (Nuclear Reactor Safety Design Criteria), Jan. 19, 1993.*

Authorized Officer Jae Neon Jeong, International Search Report and Written Opinion for Application No. PCT/US2013/072794, mailed Sep. 15, 2014, 11 pages.

Dr. Charles Miller et al., U. S. Nuclear Regulatory Commission, "Recommendations for Enhancing Reactor Safety in the 21st Century: The Near Term Task Force Review of Insights from the Fukushima Dai-ichi Accident," Jul. 12, 2011. 96 pages.

U.S. Nuclear Regulatory Commission, Regulatory Guide, "Shared Emergency and Shutdown Electric Systems for Multi-Unit Nuclear Power Plants," Regulatory Guide 1.81, Revision 1, Jan. 1975, 2 pages.

U. S. Nuclear Regulatory Commission, 10 CFR: Appendix A to Part 50—General Design Criteria for Nuclear Power Plants: Criterion 5—Sharing of structures, systems, and components, last reviewed/updated Jul. 3, 2013, 13 pages.

U.S. Nuclear Regulatory Commission, Regulatory Guide, Office of Nuclear Regulatory Research, "Criteria for Power Systems for Nuclear Power Plants," Regulatory Guide 1.32, Revision 3, Mar. 2004, 4 pages.

U.S. Nuclear Regulatory Commission, Regulatory Guide, Office of Nuclear Regulatory Research, "Criteria for Accident Monitoring Instrumentation for Nuclear Power Plants," Regulatory Guide 1.97, Revision 4, Jun. 2006, 10 pages.

Electric Power Research Institute (EPRI), "Utility Requirements Document Revision 10—Product Abstract," Dec. 15, 2008, 2 pages (abstract only, full document can be provided upon request).

Institute of Electrical and Electronics Engineers, IEEE Standard 308-2001, "IEEE Standard Criteria for Class 1E Power Systems for Nuclear Power Generating Stations," Mar. 1, 2002, 35 pages.

Institute of Electrical and Electronics Engineers, IEEE Standard 946-2004, "IEEE Recommended Practice for the Design of DC Auxiliary Power Systems for Generating Stations" Feb. 25, 1993, 39 pages.

Authorized Officer Kihwan Moon, International Preliminary Report on Patentability for Application No. PCT/US2013/072794, mailed Jun. 18, 2015, 8 pages.

* cited by examiner

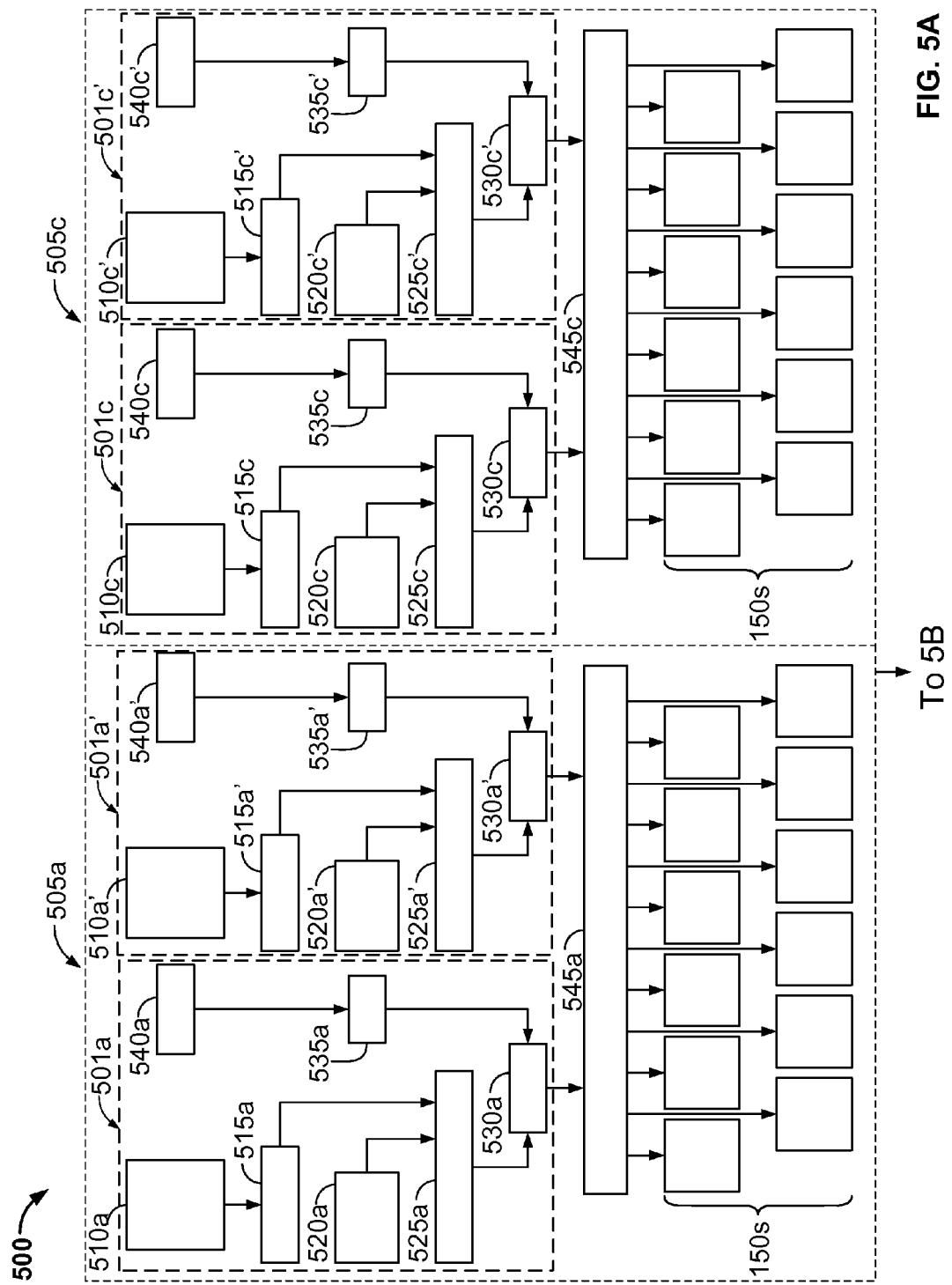

MANAGING ELECTRICAL POWER FOR A NUCLEAR REACTOR SYSTEM

CROSS-REFERENCE TO RELATED APPLICATIONS

This application claims priority to U.S. Provisional Patent Application Ser. No. 61/733,258, filed on Dec. 4, 2012, entitled "Managing Electrical Power for a Nuclear Reactor System," the entire contents of which are incorporated herein by reference in their entirety.

TECHNICAL BACKGROUND

This disclosure describes an electrical power system for a nuclear reactor system.

BACKGROUND

Electrical power systems for nuclear reactor systems may be designed and operate under a variety of constraints. For example, there may be regulatory requirements associated with safety related power systems, such as direct current (DC) powered systems. Further, there may be constraints on the type and construction of power sources, such as batteries used as power sources. For instance, only certain battery-types may be "qualified" (e.g., meet regulatory requirements such as those that define a "1E" scheme under IEEE Std 308-2001, section 3.7, endorsed by RG 1.32, which defines a safety classification of the electric equipment and systems that are essential to emergency reactor shutdown, containment isolation, reactor core cooling, and containment and reactor heat removal, or that are otherwise essential in preventing significant release of radioactive material into the environment) to provide power for particular sub-systems. Further, the design and construction of particular nuclear reactor designs may also constrain the design and operation of the electrical power system. For instance, modular reactor designs (e.g., multiple, smaller capacity nuclear reactors) may also constrain the electrical power system.

Further, commercial viability of a nuclear power plant may be impacted due to significant capital and operation and maintenance costs associated with the electrical power sources and infrastructure that supports the sources. Thus, there is a need for an improved electrical power system for a nuclear power plant.

SUMMARY

In one general implementation, an electrical distribution system for a nuclear power plant includes at least one primary alternating current (AC) power source; a first plurality of AC loads of a plurality of nuclear reactor systems of the nuclear power plant, each of the first plurality of AC loads including a critical electrical load of the plurality of nuclear reactor systems that is configured to fail to a safety position based on a loss of electrical power from the primary AC power source; a first AC power bus that is electrically coupled to the at least one primary AC power source, the first plurality of AC loads, and a first critical battery system that includes one or more non-qualified battery sources; a second plurality of AC loads of the plurality of nuclear reactor systems, each of the second plurality of AC loads including a non-critical electrical load of the plurality of nuclear reactor systems; and a second AC power bus that is electrically coupled to the at least one primary AC power source, the second plurality of AC loads, and a non-critical battery system that includes one or more qualified battery sources.

In a first aspect combinable with the general implementation, the first plurality of AC loads include engineered safety feature (ESF) electrical loads.

In a second aspect combinable with any of the previous aspects, the one or more non-qualified battery sources of the first critical battery system include valve regulated lead acid (VRLA) batteries.

In a third aspect combinable with any of the previous aspects, the second plurality of AC loads include active post-accident monitoring (PAM) electrical loads and common electrical loads.

In a fourth aspect combinable with any of the previous aspects, the one or more qualified battery sources include vented lead acid (VLA) batteries.

In a fifth aspect combinable with any of the previous aspects, the non-critical battery system includes a first battery train electrically coupled to a first channel of the second AC power bus; and a second battery train electrically coupled to a second channel of the second AC power bus, each of the first and second battery trains including one or more qualified battery sources that include VLA batteries.

A sixth aspect combinable with any of the previous aspects further includes a third battery train electrically coupled to both of the first and second channels of the second AC power bus, the third battery train including one or more qualified battery sources that include VLA batteries.

In a seventh aspect combinable with any of the previous aspects, the first critical battery system is sized to supply AC power to the first plurality of AC loads for about 24 hours based on a loss of electrical power from the primary AC power source.

In an eighth aspect combinable with any of the previous aspects, the non-critical battery systems is sized to supply AC power to the second plurality of AC loads for about 72 hours based on a loss of electrical power from the primary AC power source.

A ninth aspect combinable with any of the previous aspects further includes a third AC power bus that is electrically coupled to the primary AC power source, the first plurality of AC loads, and a second critical battery system that includes one or more non-qualified battery sources.

In a tenth aspect combinable with any of the previous aspects, each of the nuclear power systems includes a passively cooled modular nuclear reactor.

In another general implementation, a method for providing power to a nuclear power plant includes providing at least one primary alternating current (AC) power source; providing a first plurality of AC loads of a plurality of nuclear reactor systems of the nuclear power plant, each of the first plurality of AC loads including a critical electrical load of the plurality of nuclear reactor systems that is configured to fail to a safety position based on a loss of electrical power from the primary AC power source; electrically coupling a first AC power bus to the primary AC power source, the first plurality of AC loads, and a first critical battery system that includes one or more non-qualified battery sources; providing a second plurality of AC loads of the plurality of nuclear reactor systems, each of the second plurality of AC loads including a non-critical electrical load of the plurality of nuclear reactor systems; and electrically coupling a second AC power bus to the second plurality of AC loads and a non-critical battery system that includes one or more qualified battery sources.

In a first aspect combinable with the general implementation, the first plurality of AC loads include engineered safety feature (ESF) electrical loads.

In a second aspect combinable with any of the previous aspects, the one or more non-qualified battery sources of the first critical battery system include valve regulated lead acid (VRLA) batteries.

In a third aspect combinable with any of the previous aspects, the second plurality of AC loads include active post-accident monitoring (PAM) electrical loads and common electrical loads.

In a fourth aspect combinable with any of the previous aspects, the one or more qualified battery sources include vented lead acid (VLA) batteries.

A fifth aspect combinable with any of the previous aspects further includes electrically coupling a first battery train of the non-critical battery system to a first channel of the second AC power bus; and electrically coupling a second battery train of the non-critical battery system to a second channel of the second AC power bus, each of the first and second battery trains including one or more qualified battery sources that include VLA batteries.

A sixth aspect combinable with any of the previous aspects further includes electrically coupling a third battery train of the non-critical battery system to both of the first and second channels of the second AC power bus, the third battery train including one or more qualified battery sources that include VLA batteries.

A seventh aspect combinable with any of the previous aspects further includes sizing the first critical battery system to supply AC power to the first plurality of AC loads for about 24 hours based on a loss of electrical power from the primary AC power source.

An eighth aspect combinable with any of the previous aspects further includes sizing the non-critical battery systems to supply AC power to the second plurality of AC loads for about 72 hours based on a loss of electrical power from the primary AC power source.

A ninth aspect combinable with any of the previous aspects further includes electrically coupling a third AC power bus to the primary AC power source, the first plurality of AC loads, and a second critical battery system that includes one or more non-qualified battery sources.

A tenth aspect combinable with any of the previous aspects further includes detecting a loss of primary AC power from the at least one primary AC power source; adjusting at least a portion of the first plurality of AC loads to their respective safety positions; supplying AC power to the portion of the first plurality of AC loads from the one or more non-qualified battery sources through the first AC power bus; and supplying AC power to the second plurality of AC loads from the one or more qualified battery sources through the second AC power bus.

An eleventh aspect combinable with any of the previous aspects further includes detecting a restoration of primary AC power from the at least one primary AC power source; supplying AC power to the portion of the first plurality of AC loads from the at least one primary AC power source through the first AC power bus; and supplying AC power to the second plurality of AC loads from the at least one primary AC power source through the second AC power bus.

In another general implementation, an electrical power system for a nuclear power facility includes an active alternating current (AC) power bus configured to be electrically coupled to a plurality of engineered safety feature (ESF) loads of a plurality of nuclear power systems, each of the ESF loads configured to fail to a safe position upon loss of primary AC power; a critical battery system electrically coupled to the active AC bus, the critical battery system including a plurality of valve regulated lead acid (VRLA) batteries; and a primary AC power source electrically coupled to the active AC bus.

A first aspect combinable with the general implementation further includes a common AC power bus configured to be electrically coupled to a plurality of include active post-accident monitoring (PAM) electrical loads and common electrical loads of the plurality of nuclear power systems; and a passive battery system electrically coupled to the common AC bus, the passive battery system including one or more vented lead acid (VRLA) batteries.

In a second aspect combinable with any of the previous aspects, the critical battery system includes a first portion of the plurality of VRLA batteries and a second portion of the plurality of VRLA batteries.

In a third aspect combinable with any of the previous aspects, each of the first and second portions of the plurality of VRLA batteries electrically coupled separately to the active AC power bus through respective switches.

Various implementation of an electrical power system for a nuclear reactor system according to the present disclosure may include one, some, or all of the following features. For example, maintenance costs (e.g., associated with change out, testing, and otherwise) of qualified 1E batteries (e.g., vented lead acid (VLA) type batteries) may be significantly reduced. Further, costs associated with purchasing and storing such qualified 1E batteries may be significantly reduced. As another example, space requirements may be reduced by eliminating some of the qualified 1E batteries (e.g., using valve regulated lead acid (VRLA) batteries instead of VLA batteries). Also, in some modular nuclear reactor systems that use passive cooling, all safety function structures, systems, and components (SSC) may fail to their safe state upon loss of all AC and DC power without adverse impact to the nuclear power system. As another example, decay heat removal or emergency core cooling (ECC) system (e.g., natural circulation systems) may prevent core damage. Further, long term cooling following an accident without operator action for an indefinite period of time may be integral to the modular reactor design. As another example, the modular reactor design may include an offsite electrical system in combination with integrated nuclear power system features that may nearly eliminate the impact of a loss of offsite power (LOOP) event: full bypass capability for the main turbines; full "house load" (all units running) is approximately 50% of one module and can be maintained by one of several (e.g., eight) unit auxiliary transformers (UATs); and upon loss of the offsite grid or load, one reactor module may run-back to maintain the house load while allowing the other modules to initiate a controlled shutdown.

Various implementation of an electrical power system for a nuclear reactor system according to the present disclosure may include one, some, or all of the following features. For example, the electrical power system may help enhance the security of the nuclear reactor system or plant by eliminating a large target set. Further, the electrical power system may minimize capital costs, as well as operating and maintenance costs of a nuclear power system or plant that are associated with, for example, a reactor building and batteries associated with the electrical power system. As another example, the electrical power system may support nuclear reactor control room staffing by simplifying operation action. Further, the electrical power system may enhance a defense in depth by providing, for instance, diverse DC power sources. As yet another example, the electrical power system may enhance reliability by providing redundant schemes for each shared AC bus (e.g., as defined by IEEE Std 308-2001, section 3.7, endorsed by RG 1.32). As a further example, the electrical power system may support maintenance rule (e.g., 10 C.F.R. §50.65) by eliminating and/or minimizing challenges to safety systems. The electrical power system may also simplify station blackout coping.

Various implementation of an electrical power system for a nuclear reactor system according to the present disclosure may also include one, some, or all of the following features. For example, the electrical power system may support a passive nuclear reactor system, such as a system that is essentially self-contained or self-supported, which relies on natural forces, such as gravity or natural circulation, or stored energy, such as batteries, rotating inertia and compressed fluids, or an energy inherent to the system itself for its motive power, and check valves and non-cycling powered valves (which may change state to perform their intended functions, but do not require a subsequent change of state nor continuous availability of power to maintain their intended functions). As another example, the electrical power system may minimize a number of ventilated lead acid (VLA) battery cells that are used in the power system due to their qualifications for nuclear reactor applications under IEEE Standard 535.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

Figure 1:
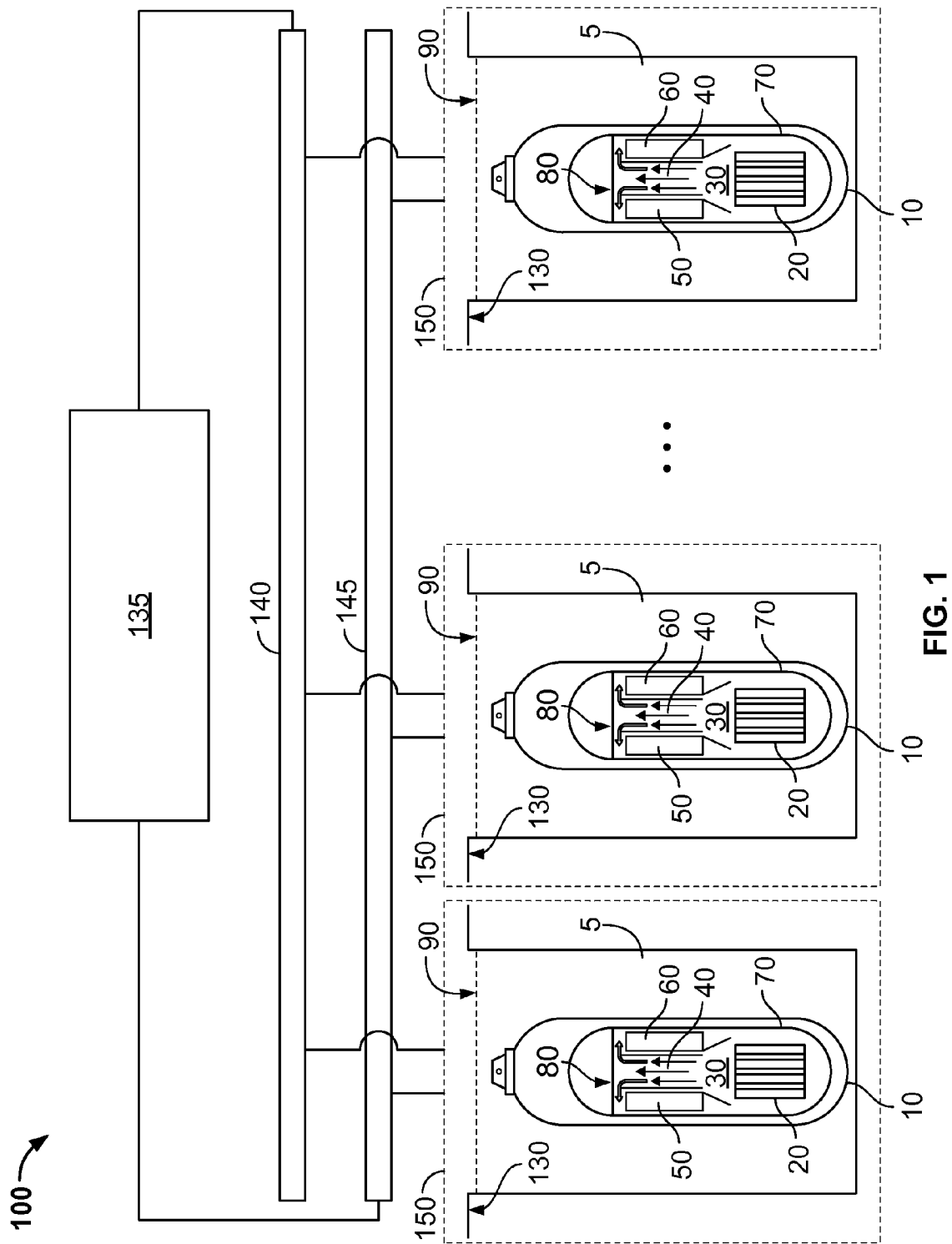
FIG. 1 illustrates a block diagram of an example implementation of a nuclear power system that includes multiple nuclear power reactors and an electrical power distribution system.

FIG. 1 illustrates an example implementation of a nuclear power system 100 that includes multiple nuclear reactor systems 150 and an electrical power distribution system. In some implementations, the system 100 may provide for an electrical power distribution system that is operable to supply electrical power to critical systems (e.g., one or more engineered safety feature (ESF) electrical loads) backed by a non-qualified battery system (e.g., VRLA type batteries) while also supply electrical power to non-critical systems (e.g., active post-accident monitoring (PAM) loads and common loads in the nuclear power system 100) backed by a qualified battery system (e.g., VLA type batteries). In some implementations, the ESF loads may be designed to fail, e.g., upon loss of main AC power, to their respective safe positions. Further, in some implementations, ESF loads may share a main bus and a back-up (or redundant) bus. The main bus and back-up bus may both be supported (e.g., electrically coupled to) by the non-qualified, or critical, battery system. In some implementations, the non-critical systems may also include AC loads that share a common bus that is supported (e.g., electrically coupled to) the qualified, or shared, battery system. In some aspects, the critical battery system may be sized to deliver power to the critical loads (e.g., loads that require motive or control power for the nuclear reactor system) through the shared and redundant busses for a 24 hour period of time. In some aspects, the shared battery system may be sized to deliver power to the non-critical loads through the common bus for a 72 hour period of time.

In FIG. 1, the system includes multiple nuclear reactor systems 150 that are electrically coupled to an electrical power system 135. Although only three nuclear reactor systems 150 are shown in this example, there may be fewer or more systems 150 that are included within or coupled to the nuclear power system 100 (e.g., 6, 9, 12, or otherwise). In one preferred implementation, there may be twelve nuclear reactor systems 150 included within the system 100, with one or more of the nuclear reactor systems 150 including a modular, light-water reactor as further described below.

With respect to each nuclear reactor system 150, a reactor core 20 is positioned at a bottom portion of a cylinder-shaped or capsule-shaped reactor vessel 70. Reactor core 20 includes a quantity of fissile material that produces a controlled reaction that may occur over a period of perhaps several years or longer. Although not shown explicitly in FIG. 1, control rods may be employed to control the rate of fission within reactor core 20. Control rods may include silver, indium, cadmium, boron, cobalt, hafnium, dysprosium, gadolinium, samarium, erbium, and europium, or their alloys and compounds. However, these are merely a few of many possible control rod materials. In nuclear reactors designed with passive operating systems, the laws of physics are employed to ensure that safe operation of the nuclear reactor is maintained during normal operation or even in an emergency condition without operator intervention or supervision, at least for some predefined period of time.

In implementations, a cylinder-shaped or capsule-shaped containment vessel 10 surrounds reactor vessel 70 and is partially or completely submerged in a reactor pool, such as below waterline 90, within reactor bay 5. The volume between reactor vessel 70 and containment vessel 10 may be partially or completely evacuated to reduce heat transfer from reactor vessel 70 to the reactor pool. However, in other implementations, the volume between reactor vessel 70 and containment vessel 10 may be at least partially filled with a gas and/or a liquid that increases heat transfer between the reactor and containment vessels. Containment vessel 10 may rest on a skirt (not shown) at the base of reactor bay 5.

In a particular implementation, reactor core 20 is submerged within a liquid, such as water, which may include boron or other additive, which rises into channel 30 after making contact with a surface of the reactor core. In FIG. 1, the upward motion of heated coolant is represented by arrows 40 within channel 30. The coolant travels over the top of heat exchangers 50 and 60 and is drawn downward by way of convection along the inner walls of reactor vessel 70 thus allowing the coolant to impart heat to heat exchangers 50 and 60. After reaching a bottom portion of the reactor vessel, contact with reactor core 20 results in heating the coolant, which again rises through channel 30.

Although heat exchangers 50 and 60 are shown as two distinct elements in FIG. 1, heat exchangers 50 and 60 may represent any number of helical coils that wrap around at least a portion of channel 30. In another implementation, a different number of helical coils may wrap around channel 30 in an opposite direction, in which, for example, a first helical coil wraps helically in a counterclockwise direction, while a second helical coil wraps helically in a clockwise direction. However, nothing prevents the use of differently-configured and/or differently-oriented heat exchangers and implementations are not limited in this regard. Further, although water line 80 is shown as being positioned just above upper portions of heat exchangers 50 and 60, in other implementations, reactor vessel 70 may include lesser or greater amounts of water.

In FIG. 1, normal operation of the nuclear reactor module proceeds in a manner wherein heated coolant rises through channel 30 and makes contact with heat exchangers 50 and 60. After contacting heat exchangers 50 and 60, the coolant sinks towards the bottom of reactor vessel 90 in a manner that induces a thermal siphoning process. In the example of FIG. 1, coolant within reactor vessel 70 remains at a pressure above atmospheric pressure, thus allowing the coolant to maintain a high temperature without vaporizing (e.g., boiling).

As coolant within heat exchangers 50 and 60 increases in temperature, the coolant may begin to boil. As the coolant within heat exchangers 50 and 60 begins to boil, vaporized coolant, such as steam, may be used to drive one or more turbines that convert the thermal potential energy of steam into electrical energy. After condensing, coolant is returned to locations near the base of heat exchangers 50 and 60.

During normal operation of the reactor module of FIG. 1, various performance parameters of the reactor may be monitored by way of sensors positioned at various locations within the module. Sensors within the reactor module may measure reactor system temperatures, reactor system pressures, containment vessel pressure, reactor primary and/or secondary coolant levels, reactor core neutron flux, and/or reactor core neutron fluence. Signals that represent these measurements may be reported external to the reactor module by way of a conduit to a reactor bay interface panel (not shown).

One or more of the components and sensors of each nuclear reactor system 150 may be critical loads, such as, for example, active ESF loads such as containment isolation valves, decay heat removal (DHR) valves, other actuatable valves and equipment, as well as sensors. In some aspects, such ESF components may be designed to fail to their safety position upon loss of control power or motive power.

In addition, one or more of the components and sensors of each nuclear reactor system 150 may be non-critical loads, such as, for example, active PAM and common loads that, in some implementations, may require a "1E" power support with a qualified (e.g., under relevant regulations) battery back-up (e.g., VLA type batteries). PAM loads may include, for example, ESF actuation system valve position indication, reactor coolant system temperature, reactor coolant system pressure, reactor coolant system level, containment temperature, containment pressure, containment level, decay heat removal level, decay heat removal pressure, reactor pool and spent fuel pool level, reactor pool and spent fuel pool temperature, neutron monitoring, and control rod position.

In the illustrated nuclear power system 100, the electrical power system 135 (shown in block diagram form) may provide AC and DC current to all of the electrical loads of the nuclear reactor systems 150 in the system 100. For example, AC power (e.g., 120 VAC, 1 phase, 60 Hz) may be provided to the nuclear reactor systems 150 through one or more AC busses 145 (illustrated as one bus but contemplated as more than one parallel bus). AC power bus 145, in some aspects, may supply AC power to critical loads (e.g., ESF loads). AC power may also be provided to non-critical loads of the nuclear reactor systems 150 through one or more AC busses 140 (illustrated as one bus but contemplated as more than one parallel bus).

Figure 2:
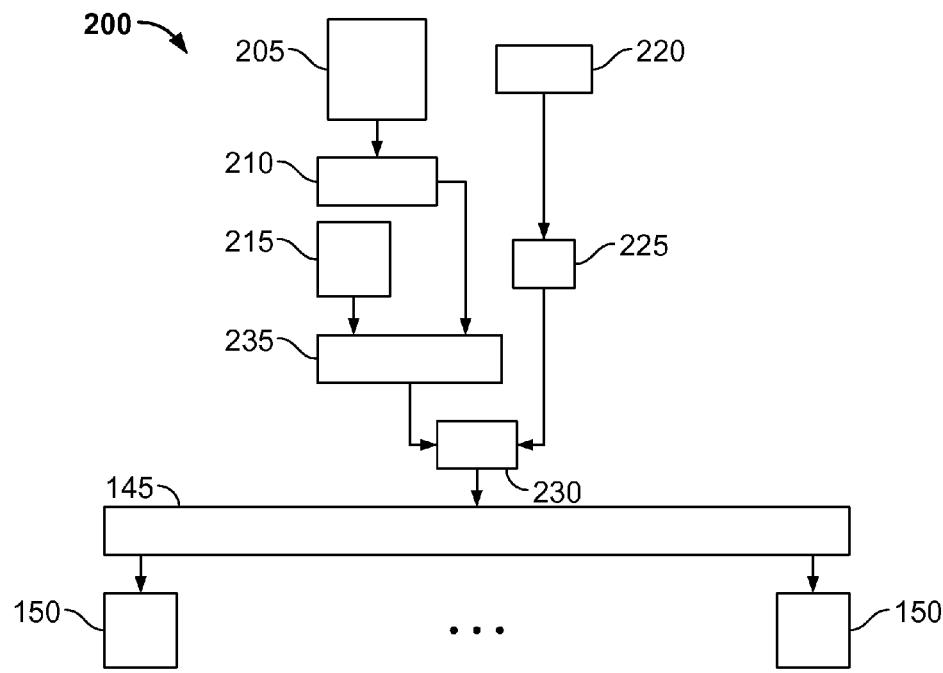
FIG. 2 illustrates a block diagram of an electrical power distribution sub-system for a nuclear power system that uses a shared back-up power source.

FIG. 2 illustrates a block diagram of an electrical power distribution sub-system 200 for a nuclear power system that uses a shared back-up power source. For example, in some aspects, the sub-system 200 may be used as part of the electrical distribution system 135 (e.g., including the AC bus (or busses) 145). In some implementations, for example, more than one sub-system 200 may be used as all or part of the electrical distribution system 135.

The illustrated sub-system 200, in some aspects, may utilize a shared battery backup 215 to supply DC power to a DC bus 235. The DC bus 235 may be transformed to AC power and supply AC power to critical power loads, such as fail-safe ESF loads. In some aspects, the battery backup 215 may include multiple VRLA batteries that have enough capacity to supply the DC bus 235 with DC power for approximately 24 hours.

The sub-system 200 also includes a primary AC source 205 that is electrically coupled to the DC bus 235 through a charger/converter 210 that converts AC power supplied by the primary AC source 205 to DC power for the DC bus 235. The charger/converter 210 may also, in some aspects, be electrically coupled to the battery backup 215 (e.g., directly or through the DC bus 235) to provide electrical charging to the battery backup 215 from the primary AC source 205. In some aspects, the primary AC source 205 (e.g., 480/3/60) may also include a backup generator (or generators) (e.g., diesel) that turns on (e.g., automatically) upon loss of power from the primary AC source 205. Thus, the primary power source for the DC bus 235 may be the primary AC source 205 (with backup diesel generator) with the battery backup 215.

The sub-system 200 also includes a utility power 220 that supplies AC power to a voltage regulating transformer (VRT) 225. In some aspects, the power sources 205 and 220 may be the same and may include utility power generated by, for example, a grid that is electrically coupled to the sub-system 200 (e.g., a grid that is powered by on-site power generation equipment, such as turbines or otherwise). The VRT 225 receives the AC power, for example, at 480 VAC, from the utility power 220 and transforms it to a clean AC power, for example at 120 VAC, to an inverter/static switch ("ISS") 230.

The illustrated ISS 230 receives, as input, a DC power from the DC bus 235 and the AC power from the VRT 225. The ISS 230 (and more specifically, the inverter portion) transforms the DC power from the DC bus 235 to AC power. Then, the ISS 230 (and more specifically, the static switch portion) can controllably select one of the two AC power sources to provide to the AC power bus 145. The AC bus 145, in turn, supplies AC power to multiple (e.g., twelve or another number) nuclear reactor systems 150 (e.g., ESF electrical loads in the systems 150).

Figure 3:
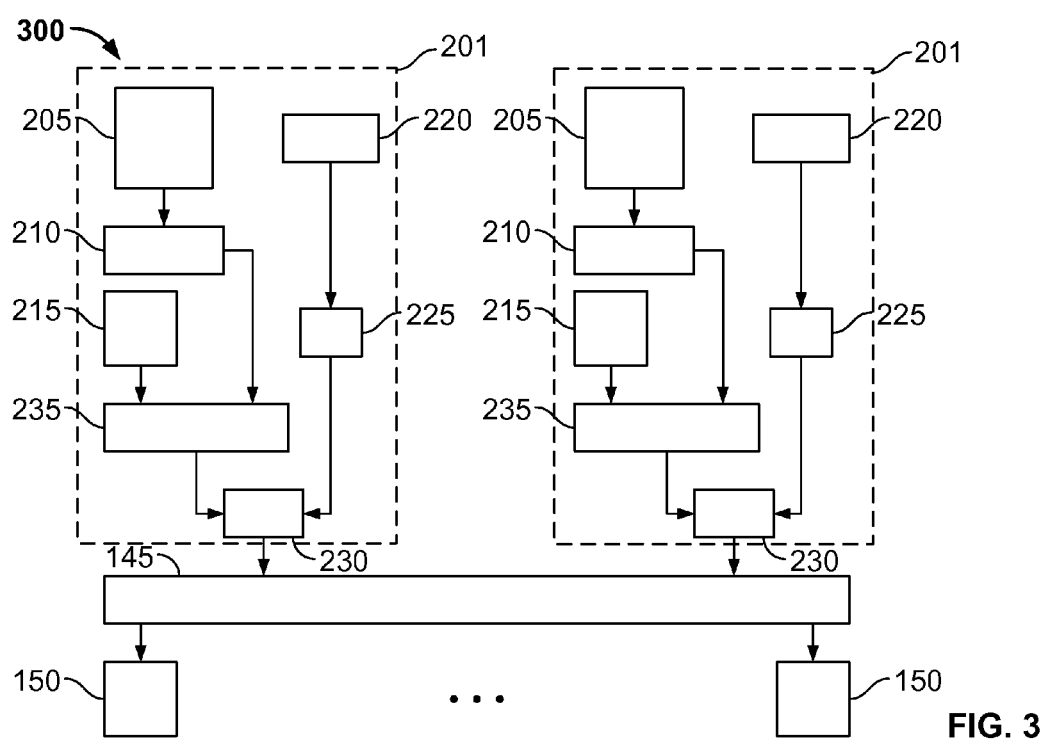
FIG. 3 illustrates a block diagram of an electrical power distribution sub-system for a nuclear power system that uses a shared and redundant back-up power source for critical loads.

FIG. 3 illustrates a block diagram of an electrical power distribution sub-system 300 for a nuclear power system that uses a shared and redundant back-up power source for critical loads, such as ESF loads. For example, in some aspects, the sub-system 300 may be used as part of the electrical distribution system 135 (e.g., including the AC bus (or busses) 145). In some implementations, for example, more than one sub-system 300 may be used as all or part (e.g., in conjunction with or in place of one or more sub-systems 201) of the electrical distribution system 135. As illustrated, the sub-system includes two 1E power scheme modules 201, which, in the illustrated example, may provide the redundancy for the ESF loads. Each 1E power scheme module 201 may be substantially similar to at least a portion of the sub-system 200 illustrated in FIG. 2 that feeds the AC bus 145.

The illustrated sub-system 300, in some aspects, may represent a shared, redundant electrical power system for a nuclear power system (e.g., nuclear power system 100) in which critical loads (e.g., ESF loads within the nuclear power systems 150) fail to their respective "safe" positions and are backed-up, in case of an AC power failure, by a non-qualified battery, e.g., battery backup 215. As illustrated, the sub-system 300 includes redundant sub-systems 200 that are both electrically coupled to the AC bus 145 in order to provide AC power to a number of nuclear reactor systems 150 (e.g., twelve, or fewer or greater).

In some aspects, the redundancy provided (as shown in FIG. 3) by adding a second sub-system 201 that is electrically coupled to AC bus 145 (e.g., a single bus or multiple busses 145) may duplicate essential functions of a single sub-system 201 to the extent that either sub-system 201 may perform the required functions regardless of the state of operation or failure of the other sub-system 201.

In some implementations, the backup battery 215 may only supply power to some, but not all, critical (e.g., ESF) loads during a loss of main power event due to, for instance, the critical loads failing to their respective safety states. For example, the backup battery 215 may only provide power to each of the nuclear reactor systems 150 in order to hold their respective emergency core cooling valves in a closed position for a particular time duration (e.g., 24 hours). This critical load may also fail to its safe, or open, position. Thus, the backup battery 215 may simply provide "holding" power to keep such valves in its non-safety, or closed position.

Figure 4:
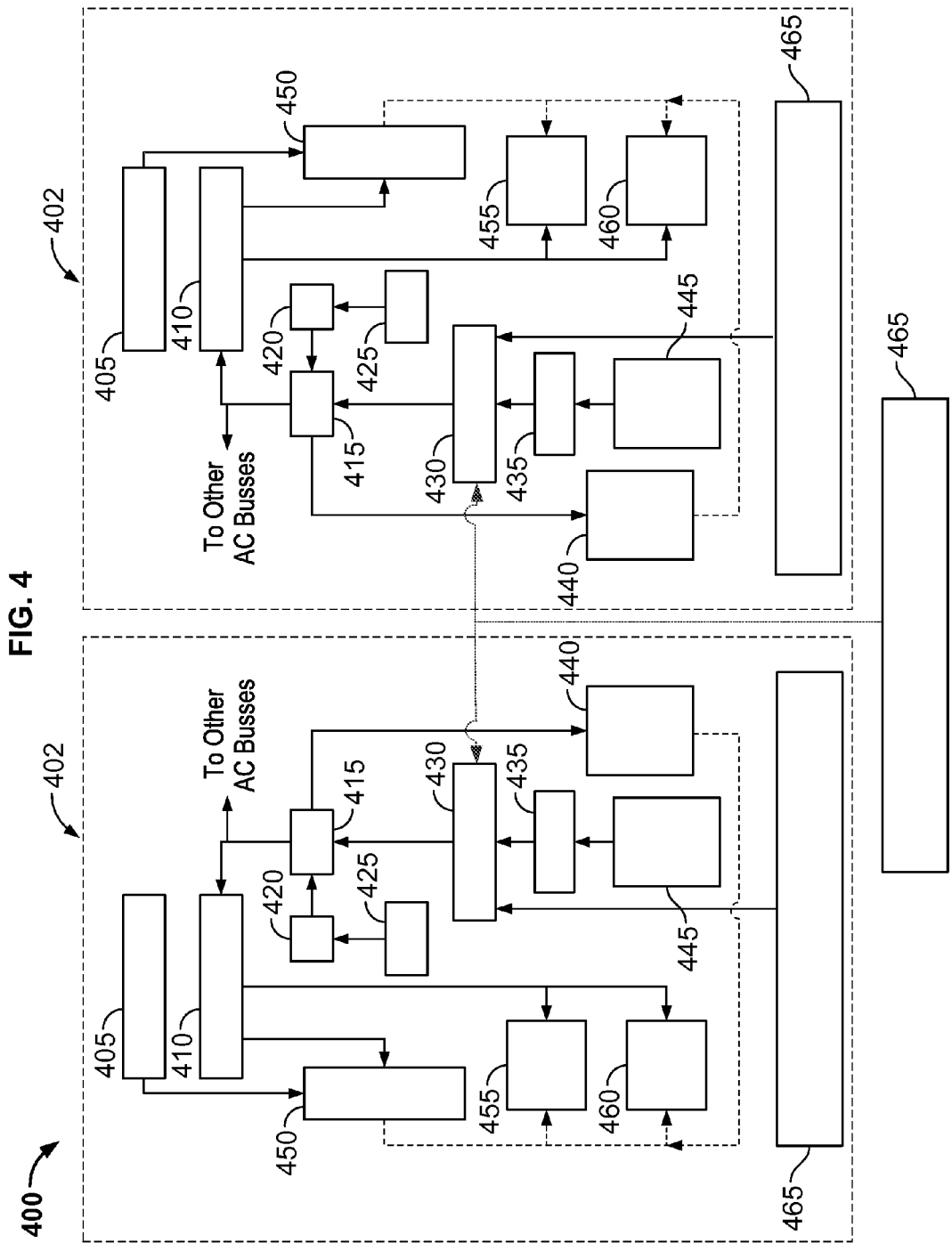
FIG. 4 illustrates a block diagram of an electrical power distribution sub-system for a nuclear power system that uses a shared back-up power source for non-critical loads.

FIG. 4 illustrates a block diagram of an electrical power distribution sub-system 400 for a nuclear power system that uses a shared back-up power source for non-critical loads, such as active common and PAM loads. For example, in some implementations, the sub-system 400 may illustrate an electrical power distribution scheme for providing AC power to such non-critical loads through backup battery trains 465 in each of two channels 402.

The sub-system 400, as shown, includes two channels 402, with each channel 402 including an AC bus 405 and a secondary AC bus 410 that each provide AC power to a separate nuclear reactor system 450. As illustrated, the AC busses 410 are served by sub-systems 300 and each AC bus 410 is supplied AC power from an inverter/static switch 415 that receives AC power from a VRT 420 and DC power from a DC bus 430. The ISS 415 converts the DC power from the DC bus 430 to AC power (e.g., in the inverter portion) and then, may controllably select from the AC power from the VRT 420 or converted AC power from the DC bus 430 (e.g., by the static switch portion). The VRT 420 receives AC power (e.g., 480/3/60) from a utility power source 425.

As illustrated, in each channel 402, an AC bus 405 serves a nuclear reactor system 450. In some implementations, the AC bus 405 is substantially similar to the AC bus 145 as shown in FIG. 3, and is supplied AC power from a sub-system that is similar or identical to the sub-system 300.

As illustrated, each DC bus 430 is electrically coupled to two sources of DC power. For example, the DC bus 430 is electrically coupled to a primary AC source 445 (that may or may not be backed-up by a generator) through a charger 435. The DC bus 430 is also electrically coupled to the battery backup train 465. In some implementations, the battery backup train 465 may include multiple VLA batteries sized to provide enough DC power for non-critical loads (e.g., common and PAM loads) for a particular amount of time after a shutdown or safety event (e.g., 72 hours or otherwise).

As further illustrated, the DC bus 430 provides DC power to an ISS 415, which in turn, transforms the DC power to AC power and supplies an AC bus 410 (as well as other AC busses). The ISS 415 is further supplied with AC power from a utility AC source 425 that is routed through a VRT 420. Thus, the ISS 415 that provides AC power to the AC bus 410 has redundant power sources. As illustrated, the ISS 415 also provides AC power, in this implementation, to a shared plant safety system (SPS system) 440 in each channel.

The AC bus 410, like the AC bus 405, provides AC power (e.g., 120/1/60) to the nuclear reactor system 450. As illustrated, the ISS 415 may serve, in this implementation, multiple AC busses that provide power to corresponding other nuclear reactor systems (e.g., such as shown in FIG. 1). The AC bus 410 also provides AC power to safety video display units (SVDUs) 455 and 460. For example, the SVDUs 455 and 460 may be specific to each particular channel 402 and, in some implementations, provide video display for such sub-systems as remote shutdown stations or other systems.

In some cases, PAM functionality is an active power demand rather than passive under the relevant guidelines. In some implementations, as illustrated here, there may be two channels of non-critical power loads (e.g., common or PAM function loads). Thus, each battery train 465 may include qualified batteries (e.g., VLA type batteries). But since PAM functionality is, in some aspects, monitoring only (even though it is active), the DC power source for such loads may be shared. Thus, in some aspects, a third battery train 465 may be included as a spare train that is shared between two channels 402. As noted above, in some aspects, each battery train 465 may be VLA-type batteries (e.g., EnerSys GN-45 capable of 3600 Ah and 1.75 FV/C or other batteries).

Figure 5A:
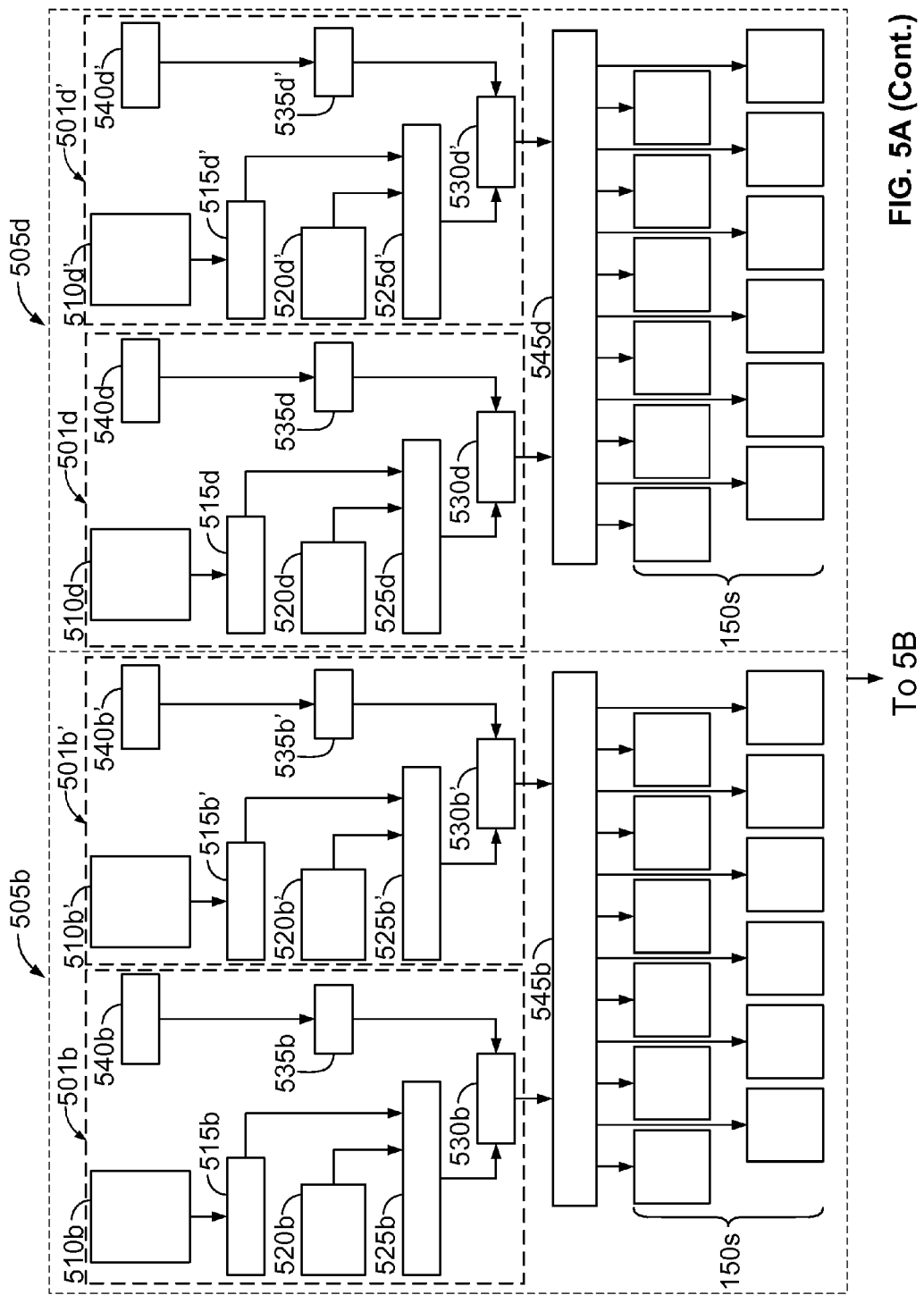
FIGS. 5A-5B illustrate a block diagram of an expanded illustration of an example implementation of an electrical power distribution system for a nuclear power system.
Figure 5B:
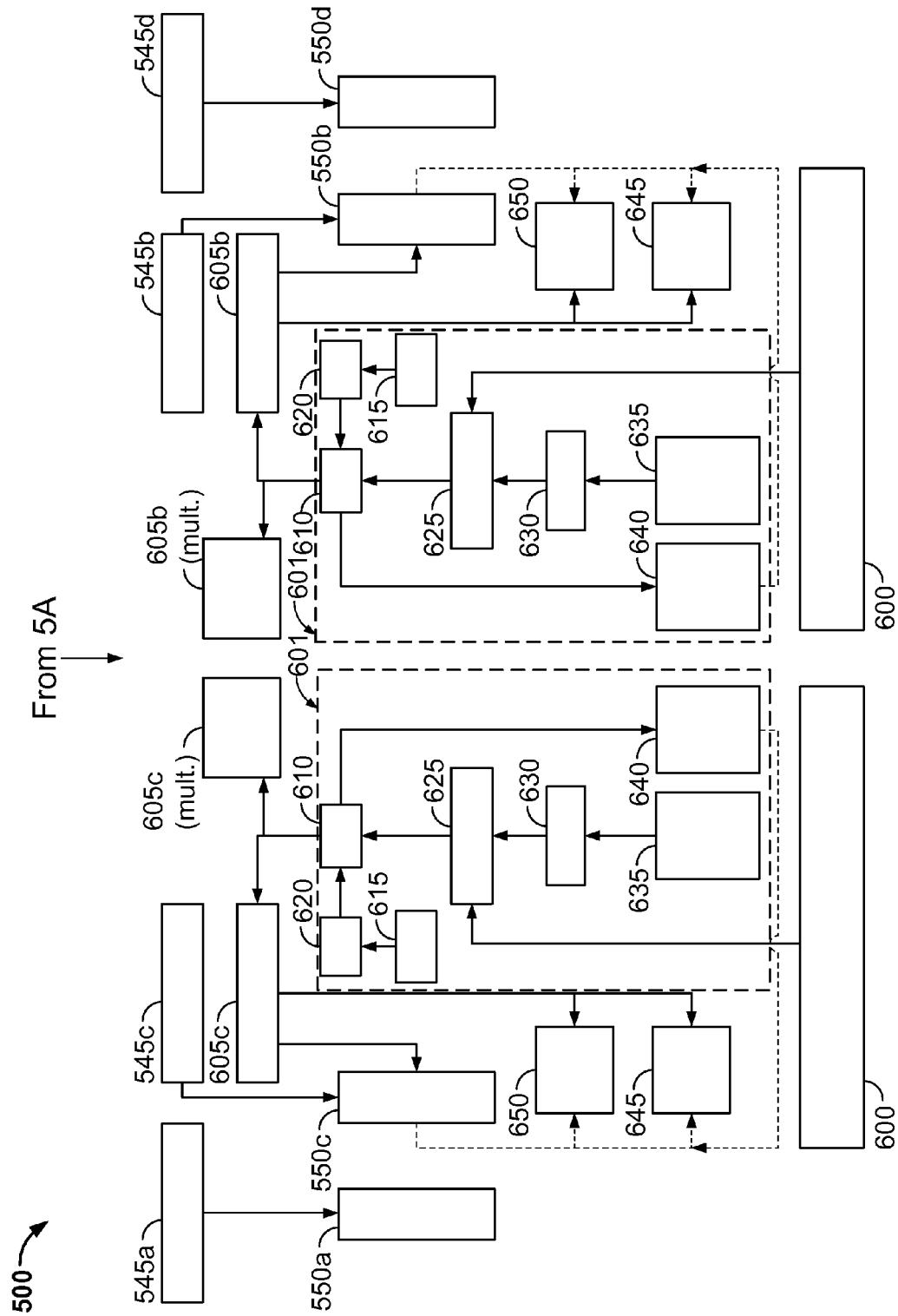

FIGS. 5A-5B illustrate a block diagram of an expanded illustration of an example implementation of an electrical power distribution system 500 for a nuclear power system. At a high level, the system 500 includes: (1) ESF, or critical loads, that, in some cases fail to their respective safe position upon loss of primary AC power and, in other cases, critical loads (e.g., ECC valves), that are maintained in their non-safe position by a non-qualified backup power source; (2) a shared, redundant electrical power system for a nuclear power system (e.g., nuclear power system 100) in which critical loads (e.g., ESF loads) have a shared and redundant, non-qualified backup power source; and (3) a shared back-up qualified 1E power source for non-critical loads, such as active common and PAM loads.

Turning particularly to FIG. 5A, system 500, as illustrated, includes four critical load modules 505a-505d that supply AC power to four channels (as explained above) of the system 500. Each module 505a-505d provides AC power for critical loads (e.g., fail-safe ESF loads) through AC power busses 545a-545d (e.g., four channels). Each AC bus 545a-545d provides power to multiple nuclear reactor systems 150 (e.g., twelve in the illustrated implementation).

As illustrated, each module 505a-505d includes two 1E power scheme modules 501, as noted by the prime, or ', symbol, which, in the illustrated example, may provide the redundancy for the ESF loads. For example, with respect to the "a" modules, each 1E power scheme module 501a and 501a' may be substantially similar to at least a portion of the sub-system 201 illustrated in FIG. 2 that feeds the AC bus 145.

Using the "a" module as an example applicable to the b-d modules, each module 505a, as illustrated, may be substantially similar to a sub-system 300 described above. For example, each module 505a may utilize a non-qualified battery backup 520a/520a' to supply DC power to the DC bus 525a/525a'. The DC bus 525a/525a' may supply DC power to critical power loads (once transformed), such as fail-safe ESF loads. In some aspects, the battery backup 520a/520a' may include multiple VRLA batteries that have enough capacity to supply the DC bus 525a/525a' with DC power for approximately 24 hours.

The module 505a also includes a primary AC source 510a/510a' that is electrically coupled to the DC bus 525a/525a' through a charger/converter 515a/515a' that converts AC power supplied by the primary AC source 510a/510a' to DC power for the DC bus 525a/525a'. In some aspects, the primary AC source 510a/510a' (e.g., 480/3/60) may also include a backup generator (e.g., diesel) that turns on (e.g., automatically) upon loss of power from the primary AC source 510a/510a'. Thus, the primary power source for the DC bus 525a/525a' may be the primary AC source 510a/510a' (with backup diesel generator) with the battery backup 520a/520a'.

The module 505a also includes a utility power 540a/540a' that supplies AC power to a VRT 535a/535a'. In some aspects, the power sources 510a/510a' and 540a/540a' may be the same and may include utility power generated by, for example, a grid that is electrically coupled to the module 505a. The VRT 535a/535a' receives the AC power, e.g., at 480/3/60, from the utility power 540a/540a' and transforms it to an AC power, e.g., 120/1/60. The stepped down AC power is provided to an inverter/static switch 530a/530a', which also receives DC power via the DC bus 525a/525a'. The ISS 530a/530a' transforms the DC power from the DC bus 525a/525a' into AC power and then, may selectively choose from the two AC power sources (e.g., from the DC bus 525a/525a' or the VRT 535a/535a') to supply to the AC bus 545a.

As illustrated with the prime designations, the modules 505a-505d include redundant sub-systems (e.g., sub-systems 200) that are both electrically coupled to AC busses 545a-545d in order to provide AC power to a number of nuclear reactor systems 150 (e.g., twelve or fewer or greater). The redundancy may duplicate essential functions of a single sub-system to the extent that either sub-system of each module 505a-505d may perform the required functions regardless of the state of operation or failure of the other sub-system.

Turning particularly to FIG. 5B, system 500 also includes sub-systems that provide DC power to such non-critical loads through backup battery trains 600 in two of four channels. As shown in FIG. 5B, four channels are illustrated, each of which provide AC power to an AC bus 545a through 545d. Each channel that supplies AC power to the AC busses 545c and 545b also includes a secondary AC bus 605c and 605b, respectively, that each provide AC power to a separate nuclear reactor system 550c and 550b, respectively.

As illustrated, the AC busses 605c and 605b are served by 1E power scheme modules 601 (e.g., similar to system 200) in that each AC bus 605c and 605b is supplied AC power from an inverter/static switch 610 that can select a particular AC power source from which to supply the busses 605c and 605b (e.g., AC power from a VRT 620 or AC power converted from DC bus 625). The VRT 620 receives AC power (e.g., 480/3/60) from a utility power source 615.

As illustrated, in each channel, an AC bus 545c/545b serves a nuclear reactor system 550c/550b. In some implementations, the AC bus 545c/545b is substantially similar to the AC bus 145 as shown in FIG. 3, and is supplied AC power from a sub-system that is similar or identical to the sub-system 300.

As illustrated, each DC bus 625 is electrically coupled to two sources of DC power. For example, the DC bus 625 is electrically coupled to a primary AC source 635 (that may or may not be backed-up by a generator) through a charger 630. In some implementations, the AC source 635 may be identical to the AC source 510. The DC bus 625 is also electrically coupled to the battery backup train 600. In some implementations, the battery backup train 600 may include multiple 1E qualified batteries, e.g., VLA type, batteries sized to provide enough DC power for non-critical loads (e.g., common and PAM loads) for a particular amount of time after a shutdown or safety event (e.g., 72 hours or otherwise).

As further illustrated, the DC bus 625 provides DC power to an inverter/static switch 610, which in turn, transforms the DC power to AC power and supplies an AC bus 605c/605b (as well as other similar AC busses). The ISS 610 is further supplied with AC power from a utility AC source 615 that is routed through a VRT 620. Thus, the ISS 610 that provides AC power to the AC bus 605c/605b has redundant power sources from which to select from to supply the busses 605c/605b.

As illustrated, the ISS 610 also provides AC power, in this implementation, to a shared plant safety system (SPS system) 640 in each channel. The SPS system 640 may include common safety shared loads in the system 500, such as, for example, reactor building vent radiation monitoring, C/R supplemental radiation monitoring, spent fuel pool (SFP) level, SFP temperature, and e-lights.

The AC bus 605c/605b, like the AC bus 545c/545b, provides AC power (e.g., 120/1/60) to the nuclear reactor system 550c/550b. As illustrated, the ISS 610 may serve, in this implementation, multiple AC busses that provide power to corresponding other nuclear reactor systems (e.g., such as shown in FIG. 1). The AC bus 605c/605b also provides AC power to safety video display units (SVDUs) 650 and 645. For example, the SVDUs 650 and 645 may be specific to each particular channel and, in some implementations, provide video display for such sub-systems as remote shutdown stations or other systems.

In some cases, PAM functionality is an active power demand rather than passive under the relevant guidelines. In some implementations, as illustrated here, there may be two channels of non-critical power loads (e.g., common or PAM function loads). Thus, each battery train 600 may include qualified batteries (e.g., VLA type batteries). But since PAM functionality is, in some aspects, monitoring only (even though it is active), the backup DC power source for such loads may be shared. Thus, in some aspects, a third battery train 600 may be included as a spare train that is shared between the two channels (e.g., the "c" and "b" channels). As noted above, in some aspects, each battery train 600 may be a qualified 1E battery train, such as VLA-type batteries (e.g., EnerSys GN-45 capable of 3600 Ah and 1.75 FV/C or other batteries).

Two additional channels (e.g., the "a" and "d" channels) are also illustrated in system 500. Each of these channels includes an AC bus 545a/545d that provides AC power to the respective the nuclear reactor systems 550a/550d.

Figure 6:
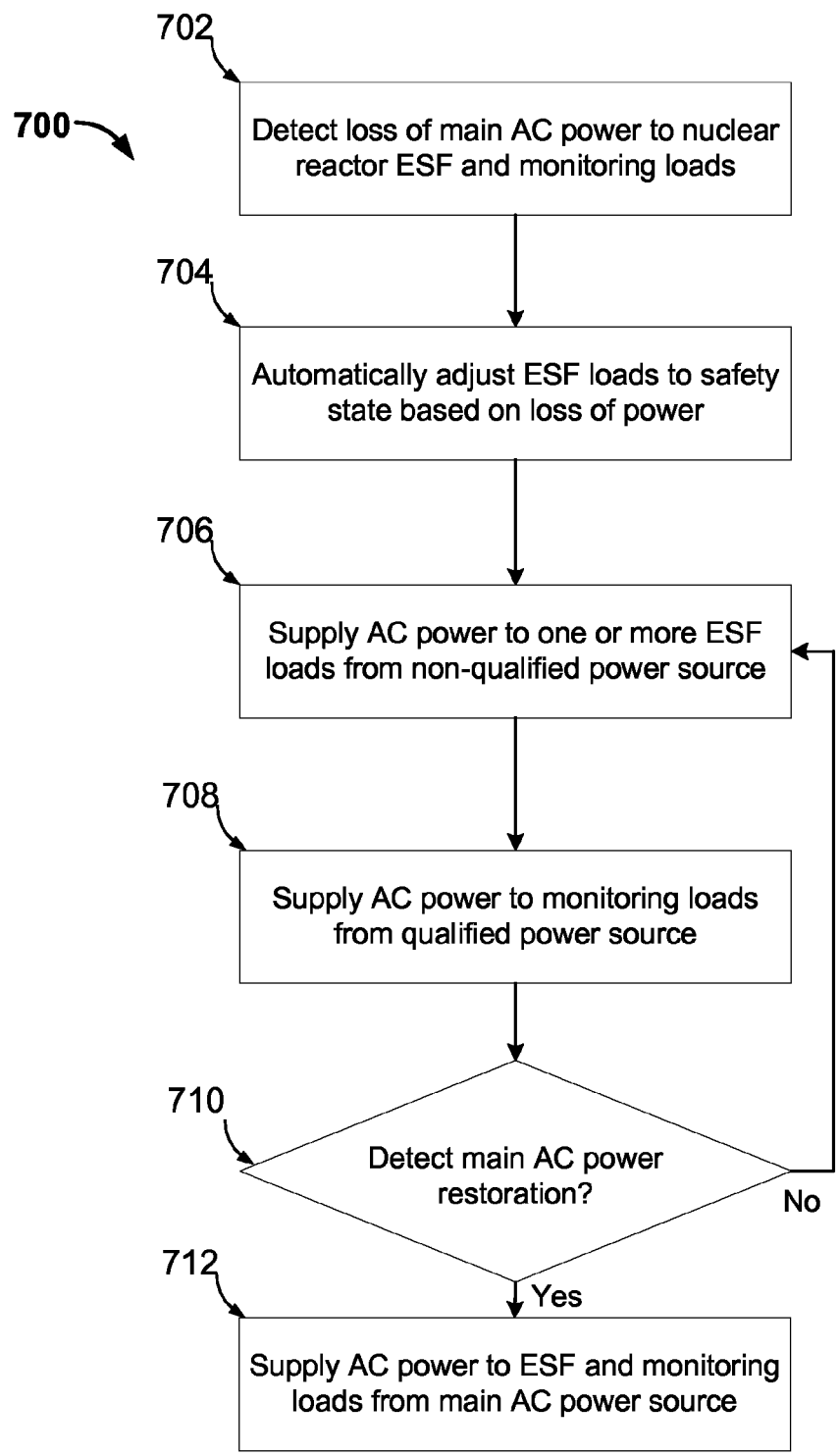
FIG. 6 is a flowchart that illustrates an example method for operating an electrical power distribution system for a nuclear power system.

FIG. 6 is a flowchart that illustrates an example method 700 for operating an electrical power distribution system for a nuclear power system. In some implementations, method 700 may be executed with all or a portion of the electrical power system 500 shown in FIGS. 5A-5B. Method 700 may begin at step 702, where a loss of main AC power that powers nuclear reactor ESF (e.g., critical) loads and monitoring (e.g., PAM) loads is detected. For example, with reference to FIGS. 5A-5B, primary AC power may be lost when AC sources 510, 540, and 615 or 635 can no longer provide primary AC power (e.g., 480/3/60) for the system.

In step 704, ESF loads (e.g., control and motive loads) automatically adjust to their respective safety, or "fail safe," states based at least in part on the loss of primary AC power. For example, with reference to FIGS. 5A-5B, the ESF loads in each of the nuclear reactor systems 150 (e.g., as shown, twelve modular reactor systems) may automatically return to fail safe positions. ESF loads may include, for example, containment isolation valves, decay heat removal (DHR) valves, other actuatable valves and equipment, as well as sensors, that are electrically coupled to the AC busses 545a-545d.

In step 706, back-up AC power is supplied to one or more ESF loads (e.g., ECC valves) from a non-qualified power source. For example, with reference to FIGS. 5A-5B, such loads may still receive AC power through ISS 530 from battery sources 525, which are non-qualified (e.g., VRLA type) batteries. As described above, each of the illustrated systems 150 may share two battery sources 525, with one being a primary back-up and the other being a redundant back-up. In some aspects, however, step 706 and the battery sources 525 may not be included. For instance, due to the ESF loads failing to their respective safe positions, the backup power source of the batteries 525, may not be necessary. In some aspects, only an emergency core cooling valve in each of the system 150 is held in an closed position for a particular time duration (e.g., 24 hours) by the battery sources 520a, 520a', etc.

In step 708, back-up AC power is supplied to the monitoring, or non-critical, loads from a qualified power source. For example, with reference to FIGS. 5A-5B, such loads may still receive AC power through ISS 610 from battery trains 600, which are qualified (e.g., VLA type) batteries.

In step 710, a determination is made whether main AC power is restored. Based on the restoration of main AC power, ESF and monitoring loads are supplied AC power from the main AC power source in step 712. Otherwise, such loads remain supplied with AC power from battery sources as described above.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results. Accordingly, the above description of example implementations does not define or constrain this disclosure. Other changes, substitutions, and alterations are also possible without departing from the spirit and scope of this disclosure.

What is claimed is:

1. An electrical distribution system for a nuclear power plant, comprising:
   at least one primary alternating current (AC) power source;
   a first plurality of AC loads of a plurality of nuclear reactor systems of the nuclear power plant, each of the first plurality of AC loads comprising a critical electrical load of the plurality of nuclear reactor systems that fails to a safety position based on a loss of electrical power from the primary AC power source;
   a first AC power bus that is electrically coupled to the at least one primary AC power source, the first plurality of AC loads, and a first critical battery system that comprises one or more non-qualified battery sources;
   a second plurality of AC loads of the plurality of nuclear reactor systems, each of the second plurality of AC loads comprising a non-critical electrical load of the plurality of nuclear reactor systems; and
   a second AC power bus that is electrically coupled to the at least one primary AC power source, the second plurality of AC loads, and a non-critical battery system that comprises one or more qualified battery sources.

2. The electrical distribution system of claim 1, wherein the first plurality of AC loads comprise engineered safety feature (ESF) electrical loads, and the one or more non-qualified battery sources of the first critical battery system comprise valve regulated lead acid (VRLA) batteries.

3. The electrical distribution system of claim 1, wherein the second plurality of AC loads comprise active post-accident monitoring (PAM) electrical loads and common electrical loads, and the one or more qualified battery sources comprise vented lead acid (V LA) batteries.

4. The electrical distribution system of claim 3, wherein the non-critical battery system comprises:
   a first battery train electrically coupled to a first channel of the second AC power bus; and
   a second battery train electrically coupled to a second channel of the second AC power bus, each of the first and second battery trains comprising one or more qualified battery sources that comprise VLA batteries.

5. The electrical distribution system of claim 4, further comprising a third battery train electrically coupled to both of the first and second channels of the second AC power bus, the third battery train comprising one or more qualified battery sources that comprise VLA batteries.

6. The electrical distribution system of claim 1, wherein the first critical battery system is sized to supply AC power to the first plurality of AC loads for about 24 hours based on a loss of electrical power from the primary AC power source.

7. The electrical distribution system of claim 1, wherein the non-critical battery systems is sized to supply AC power to the second plurality of AC loads for about 72 hours based on a loss of electrical power from the primary AC power source.

8. The electrical distribution system of claim 1, further comprising:
   a third AC power bus that is electrically coupled to the primary AC power source, the first plurality of AC loads, and a second critical battery system that comprises one or more non-qualified battery sources.

9. The electrical distribution system of claim 1, wherein each of the nuclear power systems comprises a passively cooled modular nuclear reactor.

10. A method for providing power to a nuclear power plant, comprising:
    providing at least one primary alternating current (AC) power source;
    providing a first plurality of AC loads of a plurality of nuclear reactor systems of the nuclear power plant, each of the first plurality of AC loads comprising a critical electrical load of the plurality of nuclear reactor systems that fails to a safety position based on a loss of electrical power from the primary AC power source;
    electrically coupling a first AC power bus to the primary AC power source, the first plurality of AC loads, and a first critical battery system that comprises one or more non-qualified battery sources;
    providing a second plurality of AC loads of the plurality of nuclear reactor systems, each of the second plurality of AC loads comprising a non-critical electrical load of the plurality of nuclear reactor systems; and
    electrically coupling a second AC power bus to the second plurality of AC loads and a non-critical battery system that comprises one or more qualified battery sources.

11. The method of claim 10, wherein the first plurality of AC loads comprise engineered safety feature (ESF) electrical loads, and the one or more non-qualified battery sources of the first critical battery system comprise valve regulated lead acid (VRLA) batteries.

12. The method of claim 10, wherein the second plurality of AC loads comprise active post-accident monitoring (PAM) electrical loads and common electrical loads, and the one or more qualified battery sources comprise vented lead acid (VLA) batteries.

13. The method of claim 12, further comprising:
electrically coupling a first battery train of the non-critical battery system to a first channel of the second AC power bus; and
electrically coupling a second battery train of the non-critical battery system to a second channel of the second AC power bus, each of the first and second battery trains comprising one or more qualified battery sources that comprise VLA batteries.

14. The method of claim 13, further comprising:
electrically coupling a third battery train of the non-critical battery system to both of the first and second channels of the second AC power bus, the third battery train comprising one or more qualified battery sources that comprise VLA batteries.

15. The method of claim 10, further comprising:
sizing the first critical battery system to supply AC power to the first plurality of AC loads for about 24 hours based on a loss of electrical power from the primary AC power source.

16. The method of claim 10, further comprising:
sizing the non-critical battery systems to supply AC power to the second plurality of AC loads for about 72 hours based on a loss of electrical power from the primary AC power source.

17. The method of claim 10, further comprising:
electrically coupling a third AC power bus to the primary AC power source, the first plurality of AC loads, and a second critical battery system that comprises one or more non-qualified battery sources.

18. The method of claim 10, further comprising:
detecting a loss of primary AC power from the at least one primary AC power source;
adjusting at least a portion of the first plurality of AC loads to their respective safety positions;
supplying AC power to the portion of the first plurality of AC loads from the one or more non-qualified battery sources through the first AC power bus; and
supplying AC power to the second plurality of AC loads from the one or more qualified battery sources through the second AC power bus.

19. The method of claim 18, further comprising:
detecting a restoration of primary AC power from the at least one primary AC power source;
supplying AC power to the portion of the first plurality of AC loads from the at least one primary AC power source through the first AC power bus; and
supplying AC power to the second plurality of AC loads from the at least one primary AC power source through the second AC power bus.

\* \* \* \* \*